Patented July 7, 1936

2,046,336

UNITED STATES PATENT OFFICE 2,046,336

RUBBER AND PROCESS OF TREATING SAME

Frederick J. Maywald, Rutherford, and Eric C. Kunz, Montclair, N. J.

No Drawing. Application July 19, 1932,
Serial No. 623,392

6 Claims. (Cl. 18—53)

In our application Serial No. 550,044, filed July 10, 1931 for Process of deodorizing rubber, of which this application is a continuation in part, we have disclosed certain classes and examples of aromatic odoriferous products used in the manufacture of perfume, which when combined with a rubber compound and cured, or combined with cured rubber, either mask the objectionable odor found in many rubber products or not only mask the objectionable odor but impart a permanent pleasing odor thereto. In said application it is further disclosed that in the presence of an accelerator, specifically diphenylguanidine (D. P. G.) the odorizing or deodorizing proceeds much more quickly and smaller quantities of the deodorizing principle are required, and also that where it is simply desired to mask the normal objectionable odor, less odorizing principle is required than where it is desired to impart a definite scent to the finished rubber.

In continuation of our researches, in combining what we will broadly call odorants with rubber, we have now found that certain classes of odorants when combined with rubber not only odorize the finished rubber products, but in addition thereto usefully and unexpectedly act as retardants of scorching with other accelerators, or plasticizers, or accelerators, or anti-oxidants or anti-suncracking agents or in some instances combining these functions, or two of them, and thereby producing an entirely new species of rubber product of increased durability and pleasing odor as compared with similar products now on the market. In some instances our materials give the finished goods marked germicidal qualities. Heretofore in curing rubber, organic accelerators used contained nitrogen or sulphur or both. The materials of this invention do not contain nitrogen or sulphur. Without intending to restrict ourselves to the goods named, our invention is of marked utility in air or heat cured rubber goods for personal and household use, toys, sheeting, ice and hot water bags, tubing, rubber coated fabric, gum and latex rubber products, and various more or less highly compounded stocks, made in whole or in part of latex, gum rubber, reclaim, batata, guayule, synthetic rubber mixtures, etc. Rubber goods cured by the air or dipping process, in which the dipping solution contains the perfume materials, have increased strength, and are especially suitable for many purposes, as for example, balloons, protective and sanitary devices, etc. Products made according to this invention have a better sales appeal, and by using various odorizing materials the source of manufacture can be identified.

It is known in the rubber art that certain accelerators highly useful in shortening the cure and increasing the tensile strength, impart a very objectionable odor to the finished goods and hence are unsuitable for many goods, but we have found that by the use of our perfume materials such accelerators can now be used and scorching reduced, or the curing curve flattened and prolonged. Goods so treated either have a neutral odor or a desired pleasing scent, and the goods in addition resist oxidation and suncracking for a longer period, and have both a higher initial tensile strength and a high strength after aging in an oven, equivalent to five or ten years' ordinary exposure.

Heretofore, no method of satisfactorily disinfecting rubber was known, as the use of the common antiseptics in rubber produced blooming and was otherwise harmful to the produce. We have also found that by the use of our perfume materials, the bacteria in rubber are killed, and that upon aging, the rubber remains free from bacteria and does not pick up bacteria in use. This is of great importance in children's rubber toys, and especially so of toys of such a nature or form that a child may place the toy in his mouth, and circulate the toy among other children.

In carrying out our experiments we have cured control stocks with accelerators and then have cured the same stocks with various of our materials, and in all cases have not only de-odorized or odorized the product but have accelerated its cure or increased the tensile strength, or have improved compounding and curing conditions, or have increased the aging, or resistance to suncracking, or improved the rubber in two or more of these respects.

As both accelerators and rubber compounds vary so widely, and as the materials we have found useful are so numerous, it is impossible to test out each of such materials with each known rubber compound with and without each known accelerator, because the number of experiments required and the different effects from different kinds of cures and different temperatures would run into the millions, so in the further specific description of our invention and its manner of application required in a patent specification, we can only give the general results of the several thousand tests conducted. The selected tests of particular accelerators and of particular stocks hereinafter described are illustrative, and not exclusive or limiting. In each case with the materials disclosed herein we have found beneficial results in the ultimate product besides odorization, either in quicker curing, increased tensile, or better aging and suncracking resistance, and in some cases, somewhat slower curing but unexpectedly increased aging and suncracking resistance. In some cases the initial tensile strength with and without our materials may be unchanged, and in some instances it is slightly lower and in still others increased slightly, but in all cases with materially increased aging, in oven tests equaling five and ten years' exposure, and materially increased resistance to suncracking.

Another essential in the manufacture of rubber compounds where high-power or ultra-accelerators are used is that during milling the compound must not scorch or precure, and some of our materials have been found to have the function of retarding such scorching in addition to the functions above mentioned. Also, in the manufacture of colored rubber goods it is important not to use compounding or curing ingredients which discolor the rubber, as by peppering, or which degrade the colors used in rubber, and our materials satisfy these requirements without causing porosity or other difficulties.

Odoriferous principles or products used for the manufacture of perfume are generally classed according to their principal ingredient, it being well known in the perfume industry that secret mixtures under trade names may have as many as fifteen or more ingredients, some of which tradenamed compounds we have successfully tested, but insofar as principal ingredients go, the materials suitable for our purpose, whether straight or mixed, can be classed about as follows:

Alcohols such as benzyl alcohol, phenyl ethyl alcohol, phenyl propyl alcohol, cinnamic alcohol, anisic alcohol, methyl phenyl carbinol.

Alcohols such as geraniol, citronellol, linalool.

We do not attempt to enumerate in the foregoing all odoriferous products used in compounding a desired odor known to those familiar with the art but restrict our consideration to odoriferous alcohols having a phenol coefficient of more than .05 and less than 19.5 modified Rideal-Walker test.

All the above products or a mixture of two or more of these substances will odorize or deodorize rubber goods and improve the process as well as product in one or more ways.

The standard stock used was composed of:

|  | Parts |
| --- | --- |
| Pale crepe rubber | 500 |
| Whiting | 125 |
| Zinc oxide | 25 |
| Magnesium oxide | 5 |
| Sulphur | 25 | and cures were made at fifty pounds steam (298° F.) for ninety minutes. This stock when freshly cured had a tensile strength of 1620 pounds per square inch with elongation of 8.8.

A similar stock was prepared using five parts of D. P. G. in place of the magnesium oxide, and only 17.5 parts of sulphur, and cured at 50 pounds for 20 minutes. Immediately after curing, the stock had a tensile strength of 2965 pounds per square inch and an elongation of 8.6. After similar aging 100 hours in the oven, the tensile strength was 1272 pounds per square inch and the elongation 7.8. After similar aging 200 hours in the oven the tensile strength had dropped to 585 pounds per square inch and the elongation to 5.6.

In general, similar quantities of the perfume materials are used, and from about 0.2% to 3% or more of such materials on the rubber gives desired improvement in quality, subject to particular product sought, and can easily be determined by the compounder.

Other accelerators with which our improvements give improved results comprise tetra-methyl-thiuram-mono and poly sulphides, the salts of dithio-carbamic acid such as the zinc salt of dimethyl-dithio-carbamic acid, the oxidized zinc salt of dimethy-dithio-carbamic acid, the lead salt of the same acid, piperidine-methyl-dithio-carbamate salts, mercapto-benzo-thiazole, phenyl-alpha-naphthylamine, phenyl-beta-naphthylamine, zinc-butyl-xanthate, dibenzylamine, diortho-tolyl-guanidine, aldehyde amine condensation products, xanthates and derivatives, condensation products of di-methyl-para-phenylene-diamine, thiuram-tetra-sulfid, guanidine esters, hydrocarbon substituted guanidines, amino-aldehyde types, benzal-bis-di-methyl-di-thio-carbamate, some of which are both accelerators and anti-oxidants, with some known anti-oxidants frequently used, which latter are unnecessary with this invention but the products are benefited thereby.

Hydrogenated cocoanut oil, which is mainly an alcohol of the $C_{12}$ type, has also worked satisfactorily as an accelerator.

Other experiments employing benzyl alcohol, phenyl ethyl alcohol, phenyl propyl alcohol, have also shown favorable results in accelerating, aging and other qualities in various stocks with and without softeners and other compounding materials, and with various accelerators.

In every case mentioned herein the products given either distinctly odorize the rubber compound or give it a neutral odor. Either odor can be gotten depending on the amount of perfume or de-odorizing material used.

An examination of the results of odor even after a ten year life test, where one would expect the perfume product would be driven out of the rubber compound, we find that this is not the fact. On the contrary we find that the odor of the rubber has been distinctly covered, or hidden or neutralized. Most of the products would indicate apparent combinations of some or all of the products contained in the perfuming material with the rubber molecule. The same results are obtained in the unaccelerated stocks, as are obtained in the accelerated stocks, except that in some cases in the accelerated stock the odorization is present to a greater extent on the basis of the same amount of perfume material. When we say "perfume material" we refer to odorizing material, or de-odorizing material.

Except where stated, the cures have been made at the same time and temperature, but not necessarily optimum cures in each instance as that is unnecessary in order to determine the utility of this invention, because comparisons involving under-cures or over-cures with the standard stock which is approximately at optimum cure can be made equally well. Therefore, we do not mean to be understood as stating that the cures above given using our materials are optimum cures, because some of them are apparently over-cures and some are apparently under-cures.

Summarizing the foregoing, the products having marked anti-oxidant properties are linalool, geraniol, phenyl ethyl and phenyl propyl alcohol.

Those materials which have no substantial weakening effect on the product as first cured are geraniol, citronellol, linalool, phenyl ethyl and phenyl propyl alcohol.

Other materials may slightly reduce the tensile strength below that of the standard, but show up to better advantage in the samples after aging. Thus in the five year aging periods we find that the materials which have shown better results are geraniol, linalool, phenyl ethyl and phenyl propyl alcohol and citronellol.

Those in the ten year period are linalool and phenyl ethyl and phenyl propyl alcohol.

Among the products having anti-scorch properties is linalool.

We claim as our invention:

1. Process of treating rubber comprising adding thereto an organic accelerator and a substance selected from the group consisting of aroma-producing alcohols and esters thereof in an amount not exceeding 1.0% on the rubber, and vulcanizing the resulting mixture.

2. Process of treating rubber comprising adding thereto an organic accelerator and an amount of an aroma-producing substance selected from the group consisting of phenyl ethyl alcohol, phenyl propyl alcohol, cinnamic alcohol, anisic alcohol, methyl phenyl carbinol, geraniol, citronellol, linalool, terpineol, borneol and the esters thereof in an amount not exceeding 1.0% on the rubber, and vulcanizing the resulting mixture.

3. Process of treating rubber comprising adding thereto an organic accelerator and an amount of an aroma-producing alcohol in an amount from 0.2% to 1.0% on the rubber, and vulcanizing the resulting mixture.

4. Process of treating rubber comprising adding thereto an organic accelerator and an amount of an aroma-producing alcohol selected from the group consisting of phenyl ethyl alcohol, phenyl propyl alcohol, cinnamic alcohol, anisic alcohol, methyl phenyl carbinol, geraniol, citronellol, linalool, terpineol and borneol in an amount from 0.2% to 1.0% on the rubber, and vulcanizing the resulting mixture.

5. A cured rubber product of increased durability and pleasing odor containing cured in the rubber an organic accelerator and not exceeding 1% on the rubber of a substance selected from the group consisting of aroma-producing alcohols and esters thereof.

6. A cured rubber product of increased durability and pleasing odor containing cured in the rubber an organic accelerator and not exceeding 1% on the rubber of phenyl ethyl alcohol.

ERIC C. KUNZ.
FREDERICK J. MAYWALD.